US007005592B2

(12) United States Patent
Charnock et al.

(10) Patent No.: US 7,005,592 B2
(45) Date of Patent: Feb. 28, 2006

(54) PLUNGER CONTACT ASSEMBLY FOR AN AUTOMOBILE CONTROL STALK

(75) Inventors: Martin Charnock, Lostock (GB); John Anthony Butterworth, Salford (GB)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 10/684,558

(22) Filed: Oct. 15, 2003

(65) Prior Publication Data

US 2005/0082152 A1   Apr. 21, 2005

(51) Int. Cl.
H01H 21/02   (2006.01)
(52) U.S. Cl. .................................. 200/61.54; 200/565
(58) Field of Classification Search .. 200/61.27–61.57, 200/553–563, 564–567, 571, 572, 200
See application file for complete search history.

(56) References Cited

U.S. PATENT DOCUMENTS

| | | | |
|---|---|---|---|
| 3,858,176 A | 12/1974 | Miller et al. | |
| 3,912,895 A | 10/1975 | Plana | |
| 4,273,971 A | 6/1981 | Tregurtha | |
| 4,287,397 A | 9/1981 | Codrino | |
| 4,315,117 A | 2/1982 | Kokubu et al. | |
| 4,414,442 A | 11/1983 | Berginski et al. | |
| 5,200,584 A | 4/1993 | Nagaya | |
| 5,440,085 A * | 8/1995 | Suzuki et al. | 200/61.54 |
| 5,744,769 A | 4/1998 | Proctor et al. | |
| 5,796,058 A | 8/1998 | Aimi et al. | |
| 5,952,633 A | 9/1999 | Leveque et al. | |
| 6,172,311 B1 * | 1/2001 | Hayashi | 200/61.27 |
| 6,300,852 B1 * | 10/2001 | Kato | 200/61.54 |
| 6,600,115 B1 * | 7/2003 | Hayashi | 200/239 |
| 6,617,534 B1 * | 9/2003 | Goff et al. | 200/61.54 |

FOREIGN PATENT DOCUMENTS

| | | |
|---|---|---|
| DE | 373833 | 6/1921 |
| DE | 1 156 478 | 10/1963 |
| DE | 25 09 701 | 9/1976 |
| DE | 30 30 911 A1 | 3/1982 |
| DE | 3 038 609 A1 | 5/1982 |
| FR | 75 01055 | 8/1976 |
| GB | 580301 | 9/1946 |
| GB | 1178647 | 1/1970 |
| SE | 185 278 | 10/1963 |

* cited by examiner

Primary Examiner—Elvin Enad
Assistant Examiner—M. Fishman
(74) Attorney, Agent, or Firm—Blank Rome LLP

(57) ABSTRACT

The contact switch assembly comprises a rotating housing with a stalk having a hollow shaft portion, a tip portion extending forwardly from the shaft portion and a contact arm extending downwardly from the shaft portion. The tip portion extends out from the housing to engage an adjacent inclined surface. As the housing is rotated, the stalk moves along the inclined surface so that the contact arm is moved vertically and brought into engagement with a printed circuit board (PCB) while simultaneously moving laterally across the PCB's surface. The vertical motion is caused by the rotation of the housing, while the lateral motion is caused by the stalk being forced laterally by the inclined surface. The combination of both the vertical and lateral motion provides a self-cleaning mechanism by the movement of the contacts in the lateral direction.

14 Claims, 3 Drawing Sheets

PLUNGER CONTACT ASSEMBLY FOR AN AUTOMOBILE CONTROL STALK

FIELD OF INVENTION

The present invention is directed towards a electrical contact assembly for a control stalk of an automobile having a contact that moves both vertically and laterally (horizontally) to engage and sweep across the contact of a corresponding printed circuit board or insert molded substrate.

BACKGROUND OF THE INVENTION

Electrical switches and levers of various types are well known in the automobile art. Typically, these switches or levers have an actuation device that moves the contact element of a first device into engagement with the contact element of a second device. These types of switch assemblies can be the butting type where the electrical contact is pushed linearly into engagement with its corresponding contact, or the sliding or rotating dial type, where the electrical contact is moved along the plane of the corresponding contact from an "off" position to an "on" position.

In the butting type lever, the contacts of the two devices repeatedly engage each other at the same location, where a thin film of non-conductive material can build up over time to prevent a secure electrical connection. This problem can be partially avoided by either coating or making the contacts from a precious metal, such as gold. However, this can be costly.

In the case of the dial type lever, the two contacts are in the same plane so that the contacts of the first device move along the same surface as the contacts of the second device. Similar to the problem with the butting type lever, once the contacts are engaged, the actuation of the dial is typically stopped so that the contacts are repeatedly engaged/disengaged at the same location. This allows a thin film of non-conductive material to build up at the contact point where the contacts repeatedly engage one another.

Therefore, it would be advantageous to provide a contact assembly having a contact that travels vertically onto and off of a corresponding contact pad while moving laterally across the same contact pad to provide a self-cleaning mechanism to prevent unwanted film build up on the contact surfaces. Such a contact assembly would not require a precious metal portion to prevent contamination.

SUMMARY AND OBJECTS OF THE INVENTION

The contact switch assembly of the present invention combines the features of the butting type switch and the dial type switch by moving both vertically and laterally to engage a PCB. The contact assembly includes a rotating housing and a stalk having a downwardly extending contact arm with contacts thereon. The stalk is positioned within the housing and extends out therefrom to engage an inclined surface. As the housing is rotated, the stalk moves along the inclined surface so that the contacts engage a printed circuit board (PCB) and slidably travel across its surface. The vertical motion is generated by the rotation of the housing, while the lateral motion is generated by the inclined surface pushing the stalk laterally.

Therefore the present invention provides a contact assembly that moves in both the vertical and lateral direction, providing a self-cleaning mechanism by the movement of the contacts in the lateral direction. Furthermore, the present invention provides a contact assembly having fewer parts, thereby making it easier to assembly and lowering its cost. Also, the fewer number of parts reduces the number of parts that are susceptible to wear and fatigue, increasing the reliability of the contact assembly.

DETAILED DESCRIPTION OF THE PREFERRED EMBODIMENT

Referring now to the several drawing figures in which identical elements are numbered identically throughout, a description of the preferred embodiment of the present invention will be provided.

Figure 1:
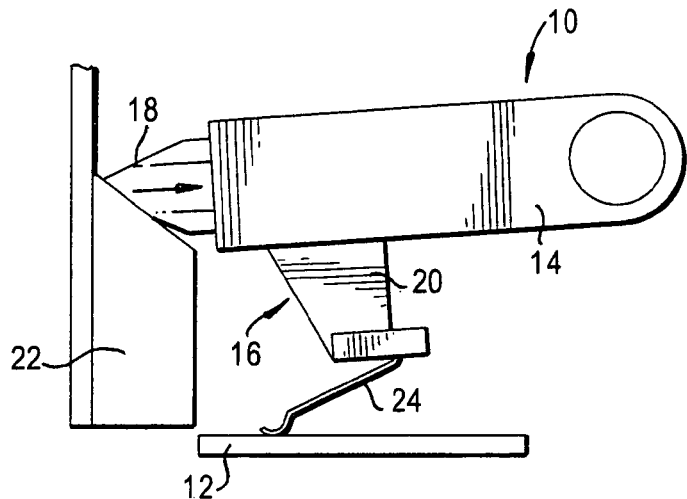
FIG. 1 shows a side view of a contact assembly of the present invention upon engagement with a PCB.
Figure 2:
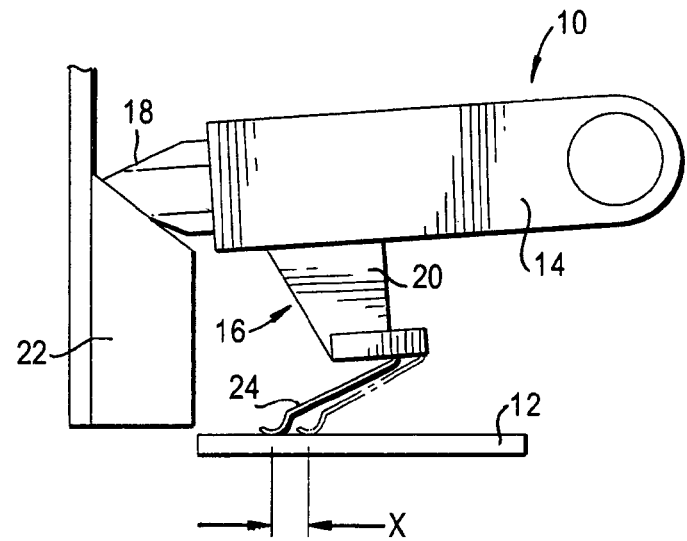
FIG. 2 shows a side view of the contact assembly of the present invention as it moves laterally across the PCB.
Figure 3:
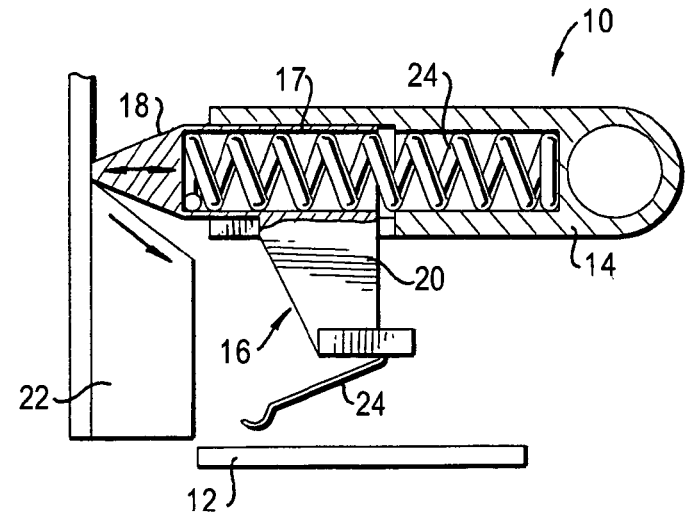
FIG. 3 shows the interior of a housing for the contact assembly.

FIGS. 1–3 show side views of the contact assembly 10 of the present invention at various stages of operation. FIG. 1 shows the contact assembly 10 upon initial contact with a printed circuit board (PCB) or insert molded substrate 12, FIG. 2 shows the movement of the contact assembly 10 across the PCB 12, and FIG. 3 shows the contact assembly 10 prior to contact with the PCB 12.

The contact assembly 10 comprises a housing 14 and a stalk 16 located therein. The stalk 16 is a reciprocating arm located within the housing 14 that includes a hollow shaft portion 17, an integrally formed forwardly extending tip portion 18 at one end of the shaft portion 17, and a downwardly extending contact arm 20 projecting from the shaft portion 17. This is best seen in FIG. 3, which shows the interior of the housing 14 and the stalk 16.

Figure 5:
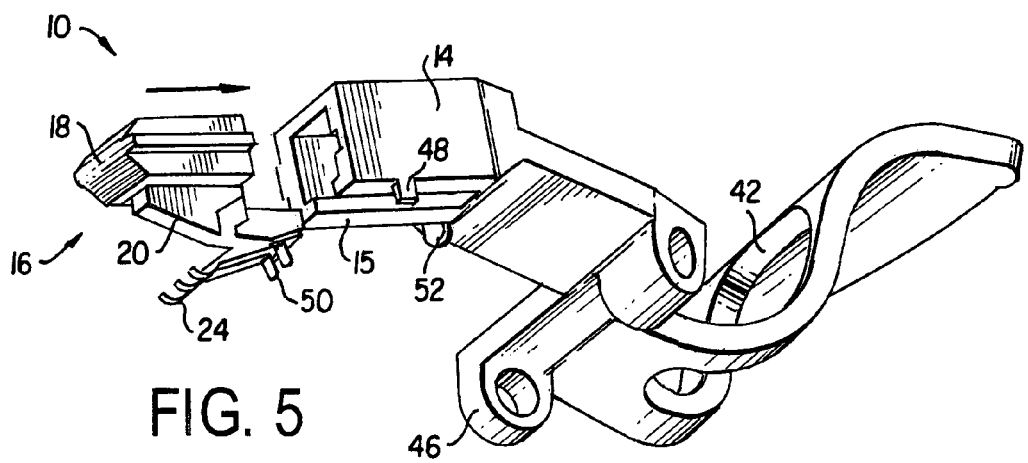
FIG. 5 shows the contact assembly of FIG. 4.
Figure 6:
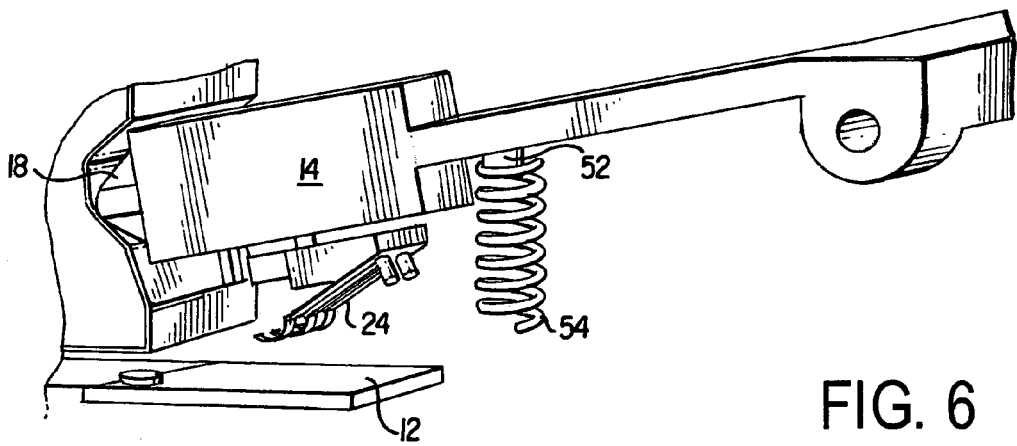
FIG. 6 shows the contact assembly of FIG. 4 incorporated into the steering wheel.

The housing 14 has a slot 15 along its bottom surface to allow the stalk 16 to move laterally with the contact arm 20 extending through the bottom of the housing 14. The slot 15 is shown in FIG. 5, and is further described later in relation to FIG. 5.

The interior of the shaft portion 17 is hollow and holds a resilient spring 24 which abuts an interior surface of the tip portion 18 to urge the stalk 16 forward. The tip portion 18 contacts a inclined surface 22 which forces the stalk 16 to move laterally, inward into the housing 14, as the contact assembly 10 is rotated counterclockwise. In other words, as the housing 14 is rotated, the stalk 16 moves both in a downward vertical direction and lateral (horizontal) direction.

The contact arm 20 of the stalk 16 extends below the tip portion 18 and includes one or more contacts 24 that extend downwardly from the contact arm 20. As the housing 14 is rotated, the contacts 24 move downwardly into contact with the PCB 12 at a first location. As the housing 14 is rotated further, the stalk 16 moves laterally further into the housing 14, thereby moving the contacts 24 across the surface of the PCB 12 to a second position. The distance between the first position and second position is referenced by X. Furthermore, the contacts 24 are resilient and are able to deflect so that as the housing 14 is rotated and the contact arm 20 is brought into closer proximity to the PCB 12, the contacts 24 deflect upward so as to keep the contacts 24 on the surface of the PCB 12.

The lateral movement of the contacts 24 across corresponding contacts on a PCB 12 provides a wiping self cleaning mechanism that prevents the harmful build up of unwanted non-conductive material on the contacts. The sliding of the contacts 24 across the PCB 12 creates a polishing effect that keeps both the contacts 24 and the PCB free of unwanted build-up of the harmful non-conductive material.

FIGS. 4–7 show a preferred embodiment of the invention where the contact assembly 10 is incorporated into a steering wheel assembly of a vehicle. The contact assembly 10 shown in FIGS. 4–7 is essentially identical in structure and operation to the contact assembly described above.

Figure 4:
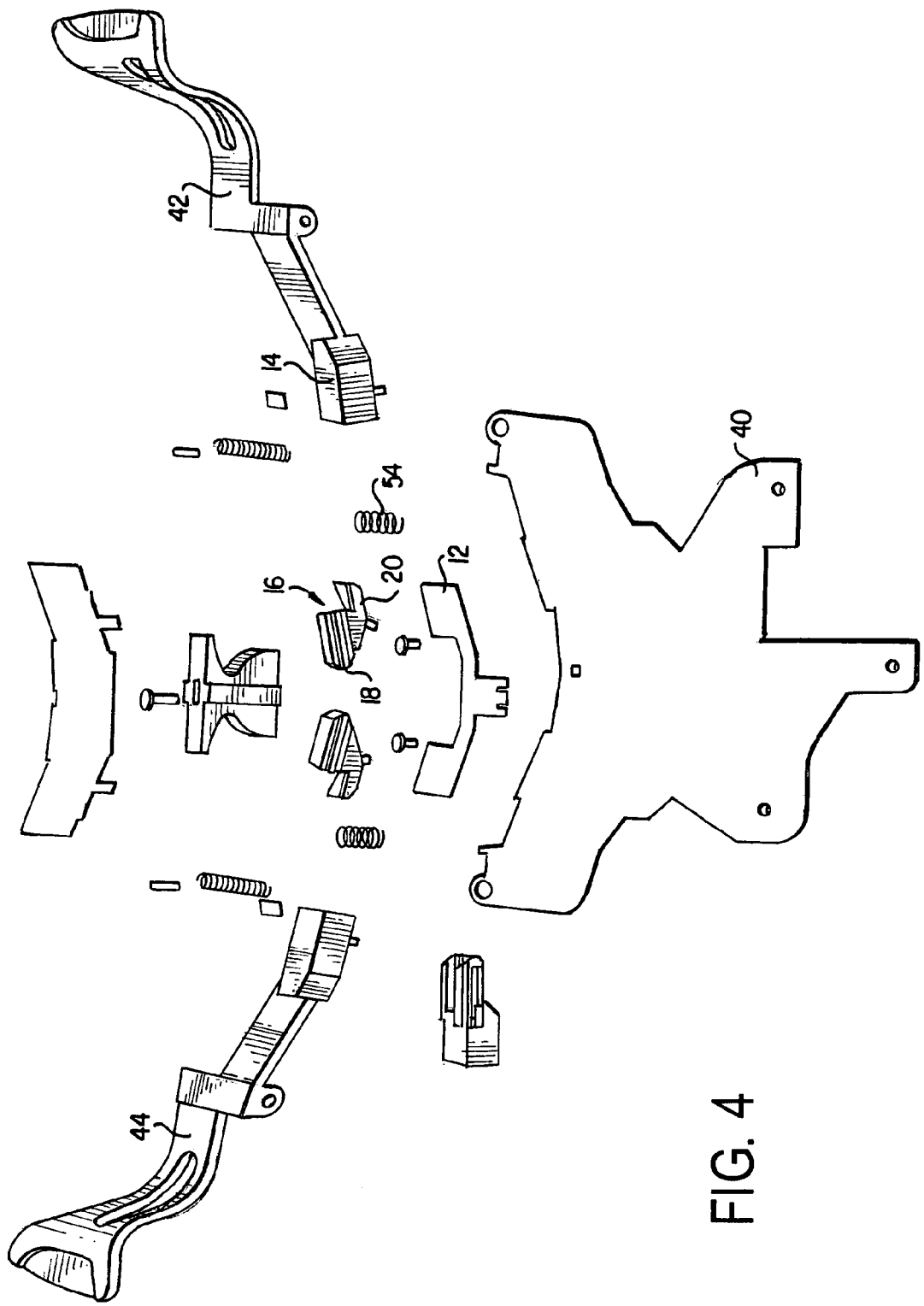
FIG. 4 shows an exploded view of the contact assembly of the present invention to be incorporated into a steering wheel.

FIG. 4 shows a housing bracket 40 which hold two contact assemblies 10. In the embodiment shown here, the contact assembly 10 is incorporated into a gear upshift lever 42 and downshift lever 44 on a steering wheel, so that actuating the lever 42 on the right, shifts the vehicle gear up, and actuating the lever 44 on the left shifts the vehicle gear down. Because the gear shift levers and contact assemblies are mirror images of one another and their structure and operation identical, only the upshift gear 42 will be described.

FIG. 5 shows the upshift lever 42 attached to the housing. The upshift lever 42 includes a pair of bearing assemblies 46, into which a pin (not shown) is inserted, and about which the contact assembly 10 rotates. As best seen in this figure, the housing 14 includes a slot 15 along its bottom surface through which the contact arm 20 moves in the lateral direction. Additionally, the bottom surface of the housing 14 includes a projection 48 which serves as a stop in cooperation with a corresponding projection 50 on the control arm 20 to prevent the spring 24 from ejecting the stalk 16 from the housing 14.

The arm of the upshift lever 42 has a circular boss 52 extending down from it. The boss 52 is positioned within a circular spring 54, as best shown in FIG. 5. The circular spring 54 urges the contact assembly 10 upward so that in the default state of the contact assembly 10, the contacts 24 are disengaged from the PCB 12. To actuate the contact assembly 10, a user would pull on the upshift lever 42 (the upshift lever is located behind the steering wheel so that a user would "pull" the lever toward his body), thereby rotating the contact assembly 10 downward onto the PCB 12. The contacts 24 would engage the PCB 12 and thereby shift the gear of the vehicle up. Similarly, a user pulling on the downshift lever 44 would actuate a corresponding contact assembly and shift the gear of the vehicle down.

Figure 7:
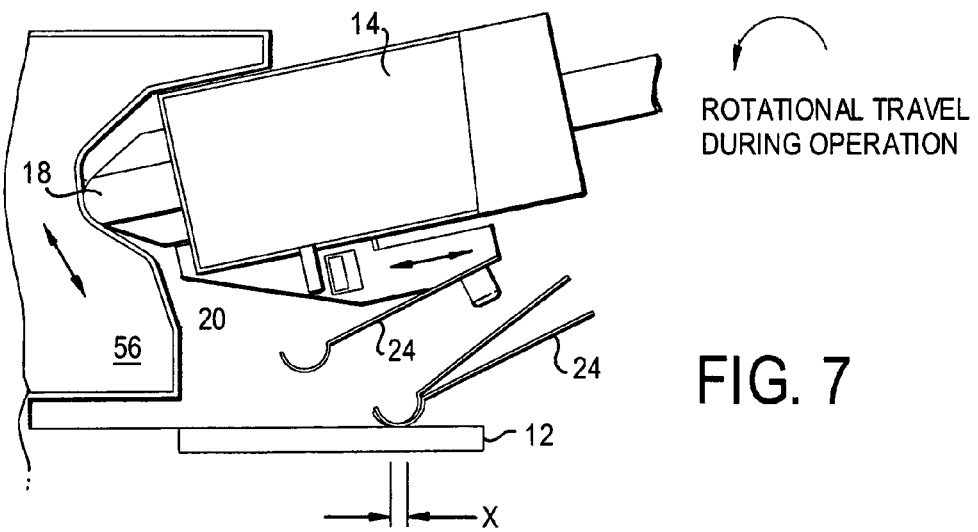
FIG. 7 shows a side view of the contact assembly of FIG. 4.

FIG. 7 is similar to FIG. 2 and shows the contact assembly in operation, except here, the profile of the inclined surface 56 is more elaborate. Here, the inclined surface 56 has a varied slope along its length which controls the magnitude of the lateral movement of the stalk 16. In this way, greater control of the movement of the contacts 24 can be obtained to meet the desired contact path.

Although the embodiment of the contact assembly 10 is described in relation to vehicular gear shift levers, it should be understood that the contact assembly 10 can be used in any electrical contact system, including vehicle multi-function stalks and other non-vehicular systems. For example, the contact assembly 10 may be used in vehicle multi-function stalks to activate window wipers, headlights, turn signals, and various other vehicle functions. Additionally, it should be appreciated that many modifications and variations of the present invention are possible in light of the above teachings, without departing from the spirit or scope of the invention.

We claim:

1. A contact assembly comprising:
a housing and a stalk, the stalk having a shaft portion located within the housing and movable laterally therein;
the stalk having a tip portion at an end of the shaft portion, and a contact arm extending from the shaft portion, the tip portion engaging an incline surface and the contact arm having a contact thereon;
wherein as the housing is rotated the stalk moves both vertically and laterally so that the contact comes into engagement with a printed circuit board and slidably moves along the surface of the printed circuit board.

2. The contact assembly of claim 1, wherein:
the tip portion extends out of the housing to engage the incline surface, and as the housing is rotated, the tip portion is urged laterally into the housing by the inclined surface.

3. The contact assembly of claim 1, wherein:
the housing includes a slot through which the contact arm extends so that the shaft portion of the stalk may move laterally relative to the housing.

4. The contact assembly of claim 1, wherein:
a spring abuts against the tip portion to urge the tip portion into engagement with the inclined surface.

5. The contact assembly of claim 4, wherein:
the shaft portion includes a hollowed out interior and the spring is placed within the hollowed out interior of the shaft portion.

6. The contact assembly of claim 1, wherein:
the contacts are resiliently fixed to the contact arm so that as the contact is brought into engagement with the printed circuit board and the contact arm is rotated into closer proximity to the printed circuit board, the contact is able to flex and remain on the surface of the printed circuit board.

7. The contact assembly of claim 1, further comprising:
a boss located on or in close proximity to the housing, the boss being adapted to cooperate with a spring to urge the contact off the printed circuit board so that the default position of the contact assembly is disengaged from the printed circuit board.

8. A contact assembly for use with a vehicle steering wheel, comprising:
a lever and a housing located at an end of the lever, the housing having a stalk, the stalk having a stalk portion laterally moveable within the housing and having a tip portion extending out of the housing in a first direction and a contact arm extending out of the housing in a second direction;
the tip portion engaging an inclined surface and the contact arm having a contact thereon engaging a printed circuit board;
wherein as the lever is actuated, the tip portion is moved along the inclined surface so that the contact engages the printed circuit board, and the inclined surface urges the contacts to move over the surface of the printed circuit board.

9. The contact assembly of claim 8, wherein:
the housing includes a slot through which the contact arm extends so that the contact arm may move laterally relative to the housing.

10. The contact assembly of claim 8, wherein:
a spring abuts against the tip portion to urge the tip portion into engagement with the inclined surface.

11. The contact assembly of claim 10, wherein:
the shaft portion that includes a hollowed out interior and the spring is placed within the hollowed out interior of the shaft portion in contact with the tip portion.

12. The contact assembly of claim 8, wherein:
the contacts are resiliently fixed to the contact arm so that as the contact is brought into engagement with the printed circuit board and the contact arm is rotated into closer proximity to the printed circuit board, the contact is able to flex and remain on the surface of the printed circuit board.

13. The contact assembly of claim 8, further comprising:
a boss located on the lever, the boss being adapted to cooperate with a spring to urge the contact assembly into a default position where the contact is disengaged from the printed circuit board.

14. The contact assembly of claim 8, wherein the inclined surface has varying slope.

* * * * *